June 30, 1936.  J. B. RONSTADT  2,045,728
GARDEN IMPLEMENT
Filed Sept. 10, 1934
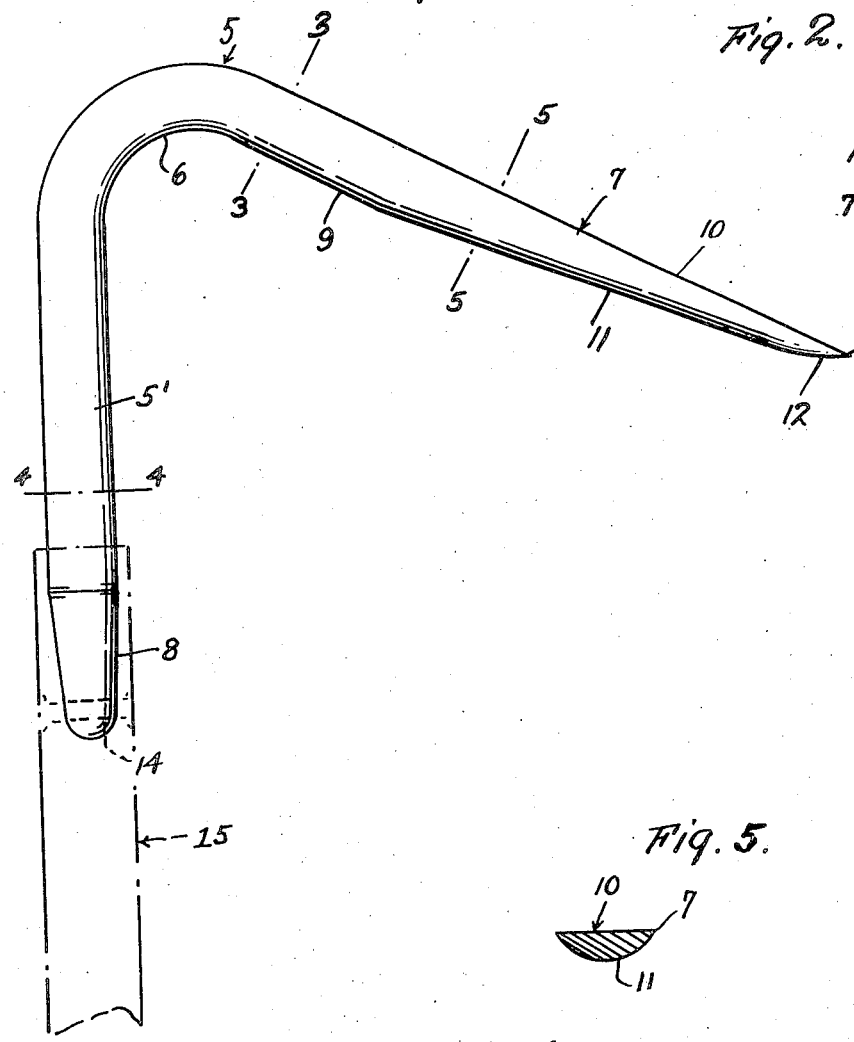
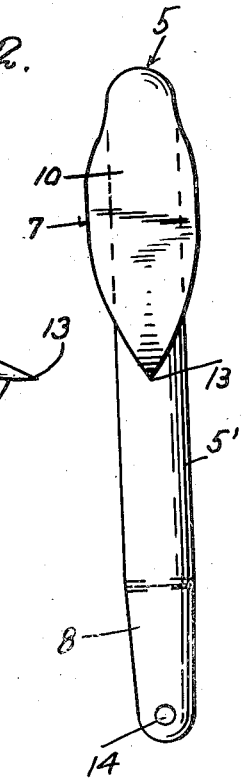
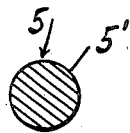
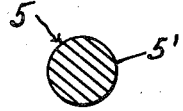
Inventor
J. B. Ronstadt
By Clarence A. O'Brien
Attorney Patented June 30, 1936

2,045,728

UNITED STATES PATENT OFFICE 2,045,728

GARDEN IMPLEMENT

John B. Ronstadt, Long Beach, Calif., assignor, by decree of court, to Claudia S. Ronstadt, widow Application September 10, 1934, Serial No. 743,467

1 Claim. (Cl. 97—61)

My invention relates generally to implements for loosening soil, and particularly to a garden implement for loosening and opening up the soil without displacing the soil as it is loosened, and an important object of my invention is to provide an improved device of this character which is simple and inexpensive in construction, and which is further efficient and durable.

Other objects and advantages of my invention will be apparent from a reading of the following description in connection with the drawing, wherein for purposes of illustration I have shown a preferred embodiment of my invention.

In the drawing:—

Figure 1 is a general side elevational view of the implement.

Figure 2 is an elevational view taken from the right of Figure 1.

Figures 3, 4 and 5 are transverse sectional views taken through Figure 1 approximately on the lines 3—3, 4—4 and 5—5, respectively.

Referring in detail to the drawing, the numeral 5 refers generally to the embodiment which includes the handle portion 5', the gooseneck portion 6, and the ground engaging portion 7.

The implement is preferably made of tool steel, the handle portion 5' being round and straight with a slight taper at the point 8, and ending in a partial gooseneck 6 which terminates in the ground engaging part 7. The inner portion of the ground engaging portion 7 is round as indicated at 9 and from this point outwardly is flattened into a leaf-shape best seen in Figure 2. The sectional view in Figure 3 illustrates the round formation up to the part 9, while the cross section in Figure 5 illustrates the flattening of the upper side or back as indicated at 10 and the continued round formation of the underside or working face as indicated at 11, terminating in a rounded graduated point part 12 which merges with the extreme point 13 which is sharp as indicated in Figures 1 and 2.

In the tapered part 8 of the handle may be provided a transverse hole 14 for receiving a rivet to lock the tool after inserting into a handle 15 about five feet long. From the point 6 to the point 13 the implement is about six inches long.

The implement may be used by grasping the handle portion 15 and swinging or pressing the ground engaging part 7 into the ground with sufficient force to cause the flattened part to pierce the ground to the desired depth, whereupon the implement is drawn toward the operator to loosen or "plow" the ground without dragging the loosened ground with it. The depth of penetration of the implement may be changed by changing the angle at which the handle 15 is held. The implement can be drawn through the ground without perceptible effort, and enables easily working between close rows of plants at arms length.

Although I have shown and described herein, a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claim.

What is claimed is:—

An implement for loosening soil, comprising a shank, a ground engaging portion and a goose neck portion formed of one piece of material, the shank being straight and having one end merging into one end of the goose neck portion, and the ground engaging portion sloping downwardly and forwardly from the other end of the goose neck portion, the shank and the goose neck portion and the upper portion of the ground engaging part being formed of rounded stock and the remaining portion of the ground engaging part being flattened and widened with its rear face flat and the front portion of the widened portion being of substantially semi-circular shape and terminating in a point and said ground engaging part gradually decreasing in thickness from the rounded upper portion to the point.

JOHN B. RONSTADT.